United States Patent
Satou et al.

(10) Patent No.: US 6,752,376 B1
(45) Date of Patent: Jun. 22, 2004

(54) FLUID CONTROLLER

(75) Inventors: Jyunji Satou, Osaka (JP); Hisatoshi Akamoto, Osaka (JP); Makoto Iwata, Osaka (JP)

(73) Assignee: Kabushiki Kaisha Fujikin, Osaka (JP)

( * ) Notice: Subject to any disclaimer, the term of this patent is extended or adjusted under 35 U.S.C. 154(b) by 0 days.

(21) Appl. No.: 10/168,742

(22) PCT Filed: Dec. 24, 1999

(86) PCT No.: PCT/JP99/07314

§ 371 (c)(1),
(2), (4) Date: Nov. 12, 2002

(87) PCT Pub. No.: WO01/48406

PCT Pub. Date: Jul. 5, 2001

(51) Int. Cl.⁷ .............................................. F16K 15/00
(52) U.S. Cl. ....................... 251/331; 251/63; 251/335.2
(58) Field of Search .............................. 251/61.1, 61.2, 251/61.3, 61.4, 61.5, 63, 63.4, 63.5, 331, 335.2

(56) References Cited

U.S. PATENT DOCUMENTS

| | | | | |
|---|---|---|---|---|
| 4,138,089 A | * | 2/1979 | McCarthy | 251/61 |
| 4,152,098 A | * | 5/1979 | Moody et al. | 417/413.1 |
| 4,210,310 A | * | 7/1980 | Kay | 251/61.1 |
| 4,546,785 A | * | 10/1985 | Sanderford | 137/85 |
| 4,732,362 A | * | 3/1988 | Morioka et al. | 251/129.17 |
| 4,966,199 A | * | 10/1990 | Ruschke | 137/843 |
| 4,968,067 A | * | 11/1990 | Whiteside | 285/305 |
| 5,060,630 A | * | 10/1991 | Boals | 122/14.31 |
| 5,163,471 A | * | 11/1992 | Powell | 137/494 |
| 5,762,314 A | * | 6/1998 | Williams | 251/25 |
| 5,938,119 A | * | 8/1999 | Yamada et al. | 239/119 |
| 6,123,320 A | * | 9/2000 | Rasanow et al. | 251/331 |

FOREIGN PATENT DOCUMENTS

| | | | | |
|---|---|---|---|---|
| JP | 406002776 A | * | 1/1994 | |
| JP | 407071628 A | * | 3/1995 | |

* cited by examiner

*Primary Examiner*—William C Doerrler
*Assistant Examiner*—Mohammad M. Ali
(74) *Attorney, Agent, or Firm*—Perkins Coie LLP; Paul L. Hickman; David Bogart Dort

(57) ABSTRACT

A flow controller (1), comprising a valve body (4) having flow paths forming an inlet and an outlet of fluid, a diaphragm (6) held fixedly between the valve body and a bonnet (5), and an operating mechanism (7) moving the diaphragm vertically, wherein the valve body flow paths communicate with each other through a projection-free communication path (8), the a diaphragm is formed so that, when lowering, it comes into close contact with the communication path so that it closes the flow path and, when rising, the center part thereof is recessed so that an area near the outer peripheral part is raised, and a curved surface (52), to which the outer upper surface (63) of the raised part is closely fitted, is formed on a bonnet on the inner lower surface of a diaphragm holding part (51).

5 Claims, 18 Drawing Sheets

FLUID CONTROLLER

This application claims priority under 35 U.S.C. §365 to International application PCT/JP99/07314 filed Dec. 24, 1999, which is incorporated by reference herein.

FIELD OF THE INVENTION

This invention is related to a fluid controller, and its object is to provide the fluid controller that is superior in processability, whereof branch plumbing is easy and puddle is hard to occur in flow paths, even the fluid controller is plumbed in inclined condition.

BACKGROUND ART

As a fluid controller used as usual, one with the structure shown in FIG. 23 is exemplified.

The fluid controller in FIG. 23 comprises a valve body C having an inlet flow path A and an outlet flow path B, a diaphragm D, a bonnet E holding fixedly periphery part of the diaphragm and an operation mechanism G moving the diaphragm in vertical direction, wherein the diaphragm D is contacted and separated to a valve base F by operating operation mechanism G so that the inlet flow path A and the outlet flow path B becomes closure state or communication state.

In the conventional fluid controller as shown in FIG. 23, however, the center processing for a cave, i.e. the inlet flow path A, the outlet flow path B and the valve body C must be accurate well adjusted when processing the flow paths so that processability was very poor because the valve base F is provided as a protrusion between the inlet flow path A and the outlet flow path B are curved and are opened at the surface of valve body C.

Also, there is a problem whereof the puddle of fluid is easy to occur inside the plumbing because flow paths are curved at the portion of the valve base F.

Moreover, in case of using this branch type fluid controller having valve base F in plumbing, there are problems that setting space of entire the plumbing becomes large because a body needs to be inclined oblique direction to prevent occurring of puddle, and also operationality and maintenance-ability are bad because operating mechanism inclines. As a new created technology to prevent puddle of fluid into plumbing, there is the disclosed in Japan tokukaihei 1-320378, for example.

The invention disclosed in Japan tokukaihei 1-320378 comprises that an inlet flow path and an outlet flow path which are arranged on the identical axis line, these inlet flow path and outlet flow path are connected with a communication path where it has no protrusion, wherein a diaphragm is contacted and separated to the inside under the communication path.

Since the inlet flow path and the outlet flow path which are arranged on the identical axis line are connected with the communication path where it has no protrusion, this invention disclosed is superior in the processability of the flow path compared with a conventional fluid controller and moreover puddle of fluid inside of the plumbing is hard to occur because there is no curve on flow paths. However, when adjusting to correspondence for the center of the diaphragm and a center of width direction of communication flow path is not carried out accurately, the flow path could not be surely closed down so that the accurate adjusting work was required.

On the other hand, for plumbing such as a pipeline system, a T-letter shaped fluid controller showing in plan view having a main path and the branch path at right angles to this main path is often used with connecting the plumbing in order to sample fluid.

In the fluid controller having a conventional branch path, however, when using the branch path substantially horizontally and the main path downward, the puddle is occurred at the bump and it becomes the cause such as propagation of the miscellaneous germs since bump exists on communication surface from the branch path to the seal base, so it is not preferable.

For prior art invented in order to solve said problem, there is the invention disclosed in Japan Patent No. 2591876 (PCT/GB91/01025).

The invention disclosed in Japan Patent No. 2591876 (PCT/GB91/01025) comprises a T-letter shaped fluid controller showing in plan view, wherein communication surface from the branch path to the seal base becomes horizontal or inclined to the main path when directing the branch path substantially horizontally and the main path downward By the above invention, an occurrence of the puddle by the bump was prevented since there is no bump which used to exist; however, the processability is very bad, and in actuality, it is difficult to disappear bump completely.

Therefore, in PCT/JP99/04544 as previously, the applicant provided a fluid controller that was hard to occur puddle in flow path and superior to processability.

FIG. 24 is a sectional view of the fluid controller that the applicant provided, FIG. 25 is a plan view of a valve body of the fluid controller and FIG. 26 is a sectional view for an A—A line in FIG. 25.

In the fluid controller, the inlet flow path and the outlet flow path are connected with the communication path where it has no protrusion, it is hard to occur puddle in flow path, and it can independently be worked processing of the outlet flow path and center processing of the valve body, hence the fluid controller is superior to processability.

Moreover, the fluid controller has a feature that by composing that the outer upper surface of the diaphragm protruded part fits closely to the curved surface which is formed at the inner lower surface of a diaphragm holding part of the bonnet when the diaphragm rises, it is possible adjusting to correspondence for the valve body and the bonnet easily very much with spending short time when producing, and it is hard to occur gap when assembling.

However, in the fluid controller provided by the applicant, there is a problem that puddle T of liquid occurs in a flow path when it is plumbed at a tilt as shown in FIG. 27.

This invention is for solving the above problem, and tries to provide the fluid controller which can prevent puddle at the minimum when it is inclined in plumbing and have excellent processability.

Disclosure of the invention

The invention relates to claim 1 is the fluid controller comprising: a valve body having inlet flow path and outlet flow path for fluid; a diaphragm held fixedly between the valve body and a bonnet; and an operation mechanism moving the diaphragm in vertical direction, wherein said flow paths of the valve body communicate with each other through a protrusion-free communication path, said diaphragm is fitted closely to the communication path when lowered so as to close the flow path and when raised, the center part of the diaphragm is recessed and its part near the outer periphery part is protruded, and a curved surface to which an outer upper surface of said protruded part is closely fitted is formed on said bonnet at the inner lower surface of a diaphragm holding part, from upper surface, said valve body is disposed a hole on the inlet flow path thirled in the direction of inlet flow path and a hole on the outlet flow path thirled in the direction of inlet flow path, and a bottom face that is orthogonal with an inflow axis of said hole on the inlet flow path and/or a bottom face that is orthogonal with the inflow axis of said hole on the outlet flow path are inclined downward toward to a bottom face of the inlet flow path and/or the outlet flow path.

The invention described in claim 2 relates to the fluid controller as claimed in claim 1, wherein said inlet flow path and said outlet flow path are comprised the inlet flow path and the outlet flow path which are arranged on the identical axis line.

The invention described in claim 3 relates to the fluid controller as claimed in claim 1, wherein said inlet flow path and said outlet flow path are T-letter shaped flow paths comprising a penetration flow path penetrating the valve body and a branch flow path branched from the penetration flow path and a bottom surface of the penetration flow path exists at the same level as a bottom surface of the communication path.

The invention described in claim 4 relates to the fluid controller as claimed in claim 1, wherein said inlet flow path and said outlet flow path are T-letter shaped flow path comprising a penetration flow path penetrating the valve body and a branch flow path branched from the penetration flow path, the penetration flow path is where a central axis line thereof is positioned below a bottom of said communication path, and a communication surface from the penetration flow path to the communication path is formed as an inclination horizontally or downward when the penetration flow path is arranged horizontally and the branch flow path is arranged downward.

The invention described in claim 5 relates to the fluid controller as claimed in claim 4, wherein the diameter of said penetration flow path is larger than the diameter of the branch flow path.

THE BEST EMBODIMENT FOR THE INVENTION

Figure 1:
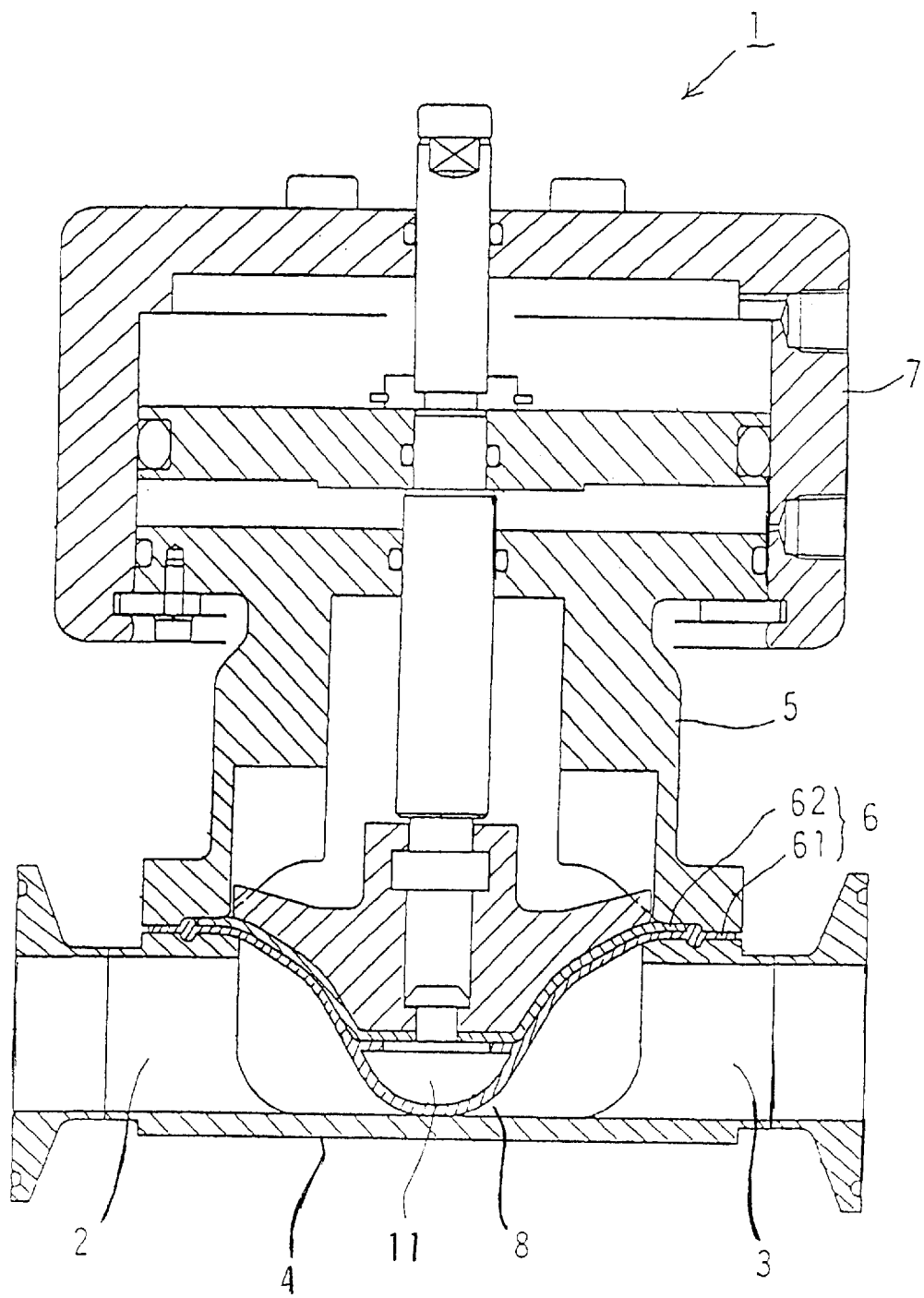
FIG. 1 is a sectional view showing the 1st embodiment in the fluid controller related to the present invention.

Hereinafter, preferable embodiments for the fluid controller related to the present invention are explained based on the drawing.

Figure 2:
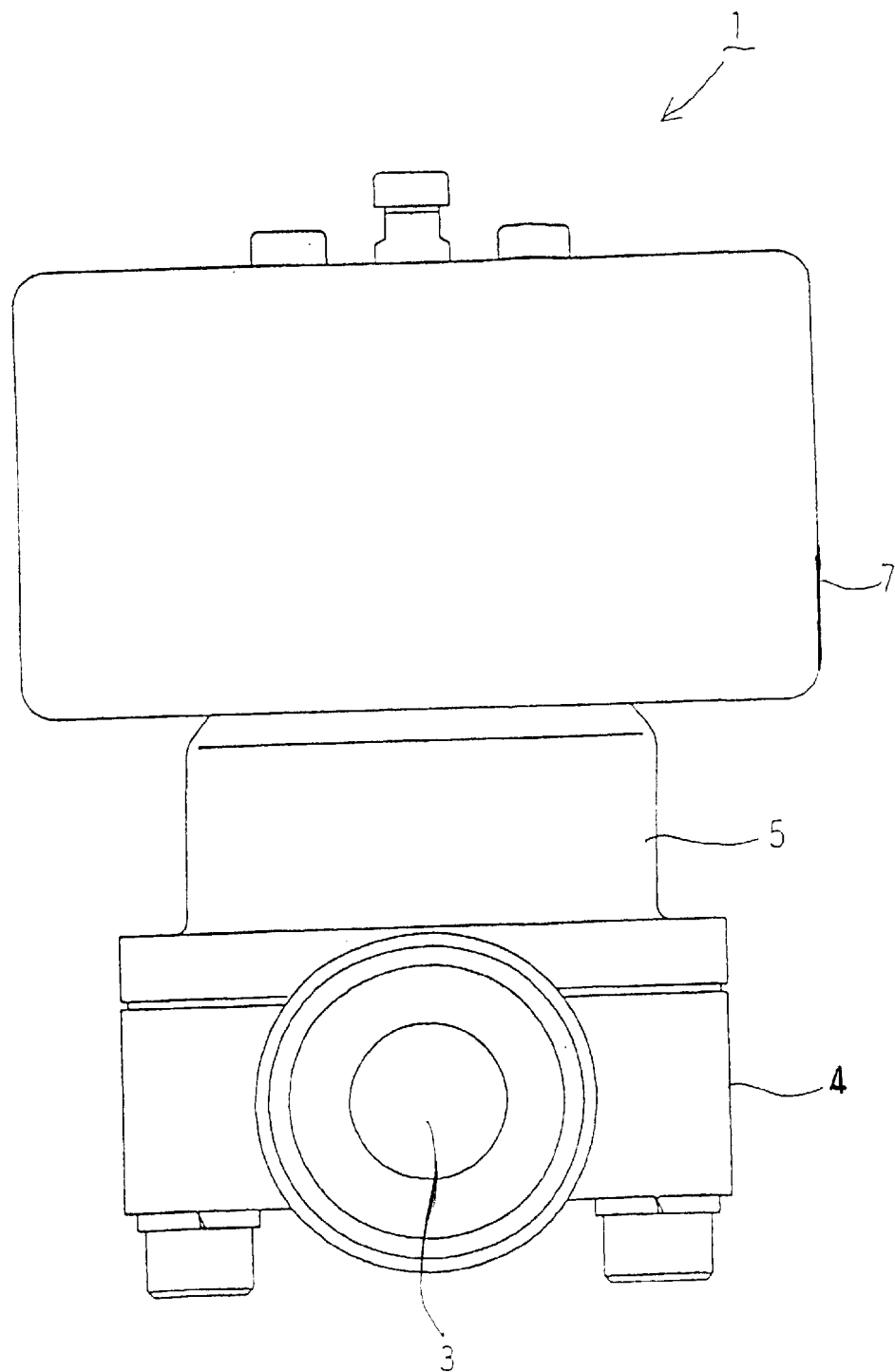
FIG. 2 is a side view of the fluid controller related to the 1st embodiment.

FIG. 1 is a sectional view showing the 1st embodiment in the fluid controller related to the present invention and FIG. 2 is its side view.

The fluid controller 1 related to the 1st embodiment comprises: a valve body 4 having a inlet flow path 2 and an outlet flow path 3; a diaphragm 6 held fixedly between upper surface of the valve body 4 and the lower surface of a bonnet 5; and an operation mechanism 7 moving the diaphragm 6 in vertical direction.

The inlet flow path 2 and the outlet flow path 3 are arranged on the identical axis line as shown in Figures, and the inlet flow path 2 and the outlet flow path 3 communicate with each other through a protrusion-free communication path 8.

In the fluid controller 1 related to the 1st embodiment, since the inlet flow path 2 and the outlet flow path 3 communicate with each other through the protrusion-free communication path 8 as the above, puddle never occurs in the flow paths.

Figure 3:
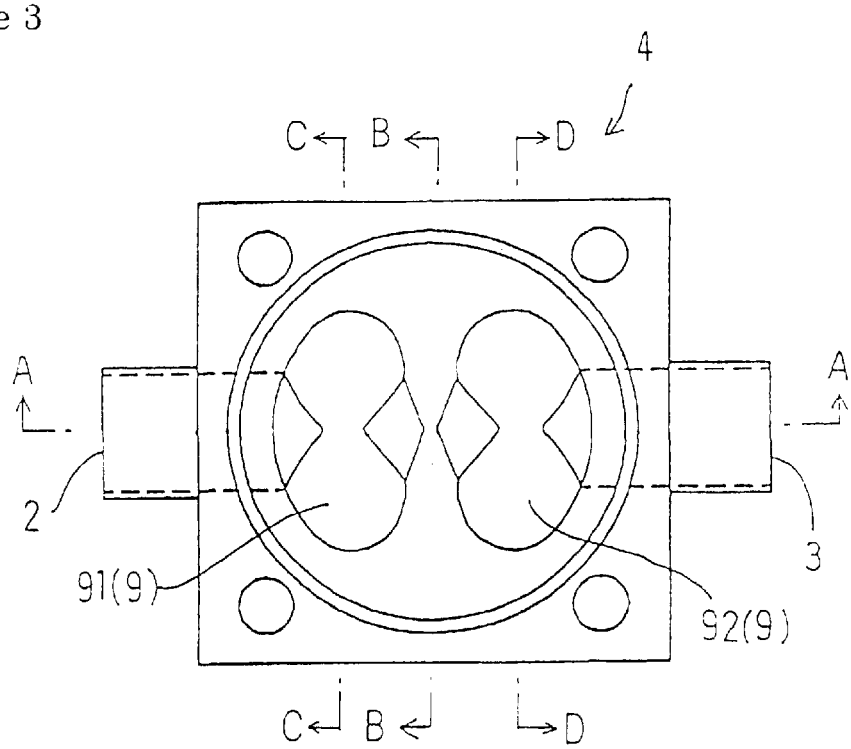
FIG. 3 is a plan view showing the 1st implementation form of the valve body of the fluid controller related to the 1st embodiment.
Figure 4:
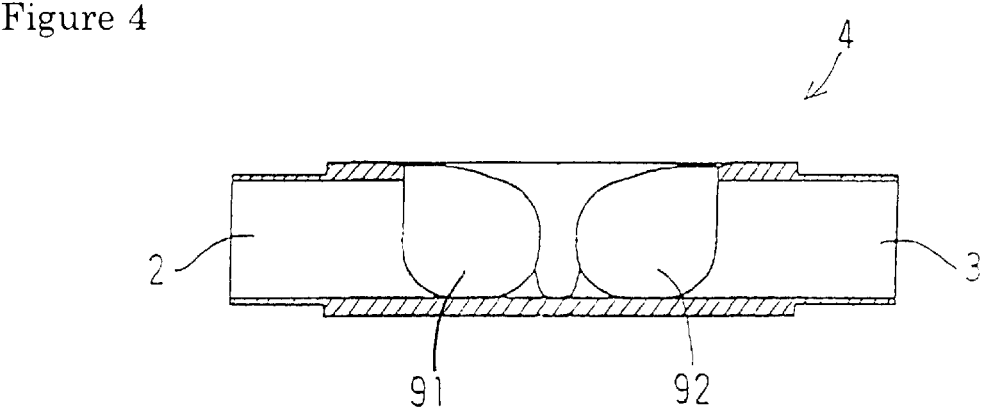
FIG. 4 is a sectional view for an A—A line in FIG. 3.
Figure 5:
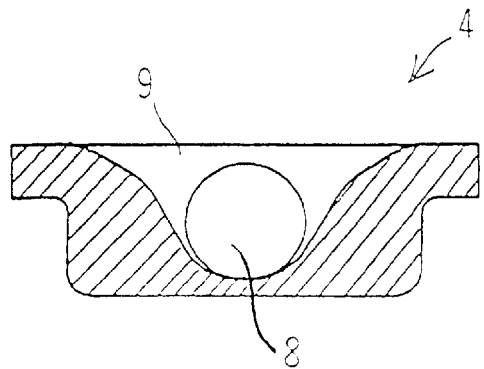
FIG. 5 is a sectional view for a B—B line in FIG. 3.
Figure 6:
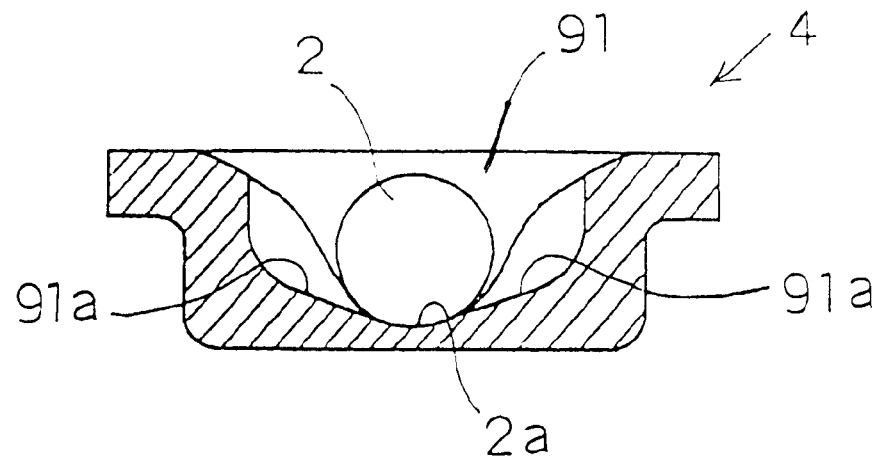
FIG. 6 is a sectional view for a C—C line in FIG. 3.
Figure 7:
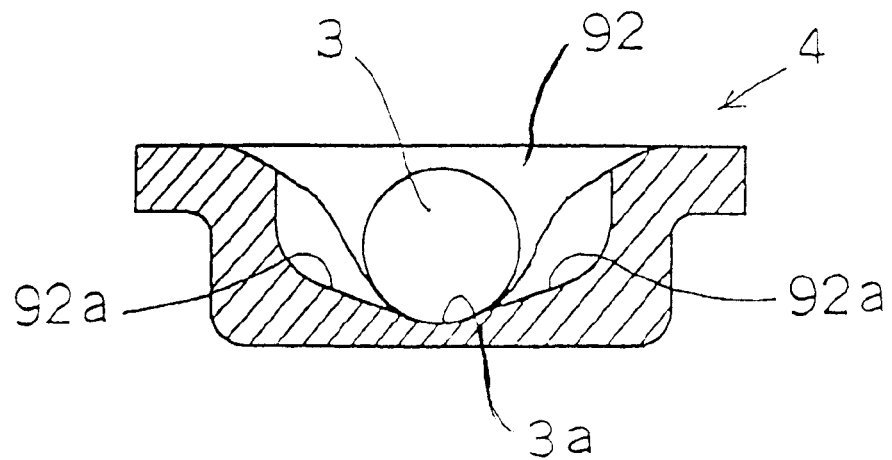
FIG. 7 is a sectional view for a D—D line in FIG. 3.

FIG. 3 is a plan view showing the valve body 4 of the fluid controller 1 related to the 1st embodiment, FIG. 4 is a sectional view for an A—A line in FIG. 3, FIG. 5 is a sectional view for a B—B line in FIG. 3, FIG. 6 is a sectional view for a C—C line in FIG. 3, FIG. 7 is a sectional view for a D—D line in FIG. 3.

The valve body 4 is arranged the inlet flow path 2 and the outlet flow path 3 on the identical axis line, and the inlet flow path 2 and outlet flow path 3 communicate with each other through a protrusion-free communication path 8.

A hole on the inlet flow path side 91 is thirled from upper surface of the body in the direction of the inlet flow path 2, and a hole on the outlet flow path side 92 is thirled as well as from upper surface of the body in the direction of the outlet flow path 3.

This valve body 4 is superior in processability very much and branch plumbing is easy to be carried out since a processing for a cave, i.e. the inlet flow path 2 and outlet flow path 3 and a center processing for valve body 4 can be worked independently.

The most feature of the fluid controller related to the present invention is as shown in FIG. 6 and FIG. 7 that a bottom face 91a that is orthogonal with flow path axis (a center axis of inlet flow path 2) of a hole on the inlet flow path 91 inclines downward in the direction of a bottom face 2a of an inlet flow path 2 and a bottom face 92a that is orthogonal with the flow path (a center axis of outlet flow path 3) of a hole on the outlet flow path 92 inclines downward in the direction of a bottom face 3a of an outlet flow path 3.

Then, these bottom face 91a and 92a of hole on the inlet flow path 91 and hole on the outlet flow path 92 are in collinear and a side face to the bottom face 91a and 92a of the hole on the inlet flow path 91 and the hole on the outlet flow path 92 is almost perpendicular to a bottom face 2a and 3a of the inlet flow path 2 and the outlet flow path 3.

By this composition of the fluid controller related to the present invention, liquid in a flow path can achieve to the inlet flow path 2 or the outlet flow path 3 with flowing along inclined the bottom face 91a or the bottom face 92a even if the fluid controller slightly inclines when it is plumbed, therefore, the fluid controller related to the present invention can prevent to occur puddle in inflow path.

In the present invention, angle of gradient (angle of gradient to horizontal surface when upper surface of the valve body is arranged horizontally) of the bottom face 91a and 92a is not limited particularly, it is desirably a range of 20~50 degrees. This is because if the angle of gradient is too small, when inclination of the fluid controller becomes slightly big, puddle occurs in the flow path then effect is scanty, and it is not desirable. Incidentally, value of this desirable angle of gradient is as well as a bottom surface 93a and 94a in embodiments described later.

Figure 8:
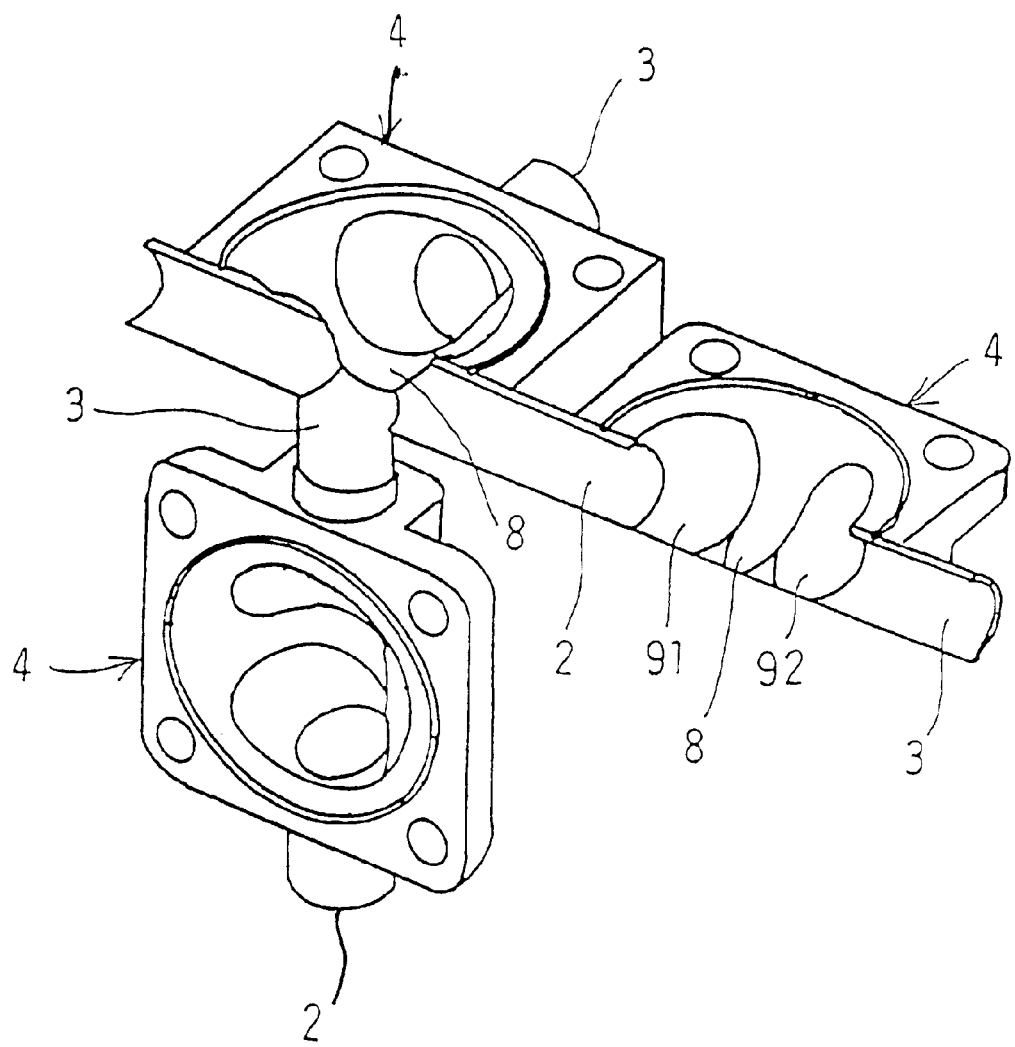
FIG. 8 is a view showing the case when the fluid controller related to the present invention is used as a branch valve.

FIG. 8 is a view showing the case when the fluid controller 1 related to the present invention is used as a branch valve. Incidentally, only valve body 4 is shown in the Figure.

In the fluid controller 1 related to the present invention, since the inlet flow path 2 and the outlet flow path 3 are arranged on the identical axis line and the inlet flow path 2 and the outlet flow path 3 communicate with each other through a protrusion-free communication path 8, the perpendicular plumbing without leaning a body is possible by penetrating downward the inlet flow path side 91 or the hole on the outlet flow path side 92 as it is and the horizontal plumbing without leaning a body is possible by penetrating the inlet flow path side 91 or the hole on the outlet flow path side 92 horizontally as it is, as shown in Figure, so that it is superior in the weld work-ability on the branch plumbing, operationality of actuator and maintenance-ability.

Moreover, since the bottom face 91a of the hole on the inlet flow path side 91 and the bottom face 92a of the hole on the outlet flow path side 92 incline downward in the direction of the bottom face 2a and 3a of the inlet flow path 2 and the outlet flow path 3, in the case of horizontally or perpendicularly branch plumbing as these, occurring of puddle in the flow path can be prevented at the minimum, even if the valve body which should be arranged in horizontally slightly inclines.

Figure 9:
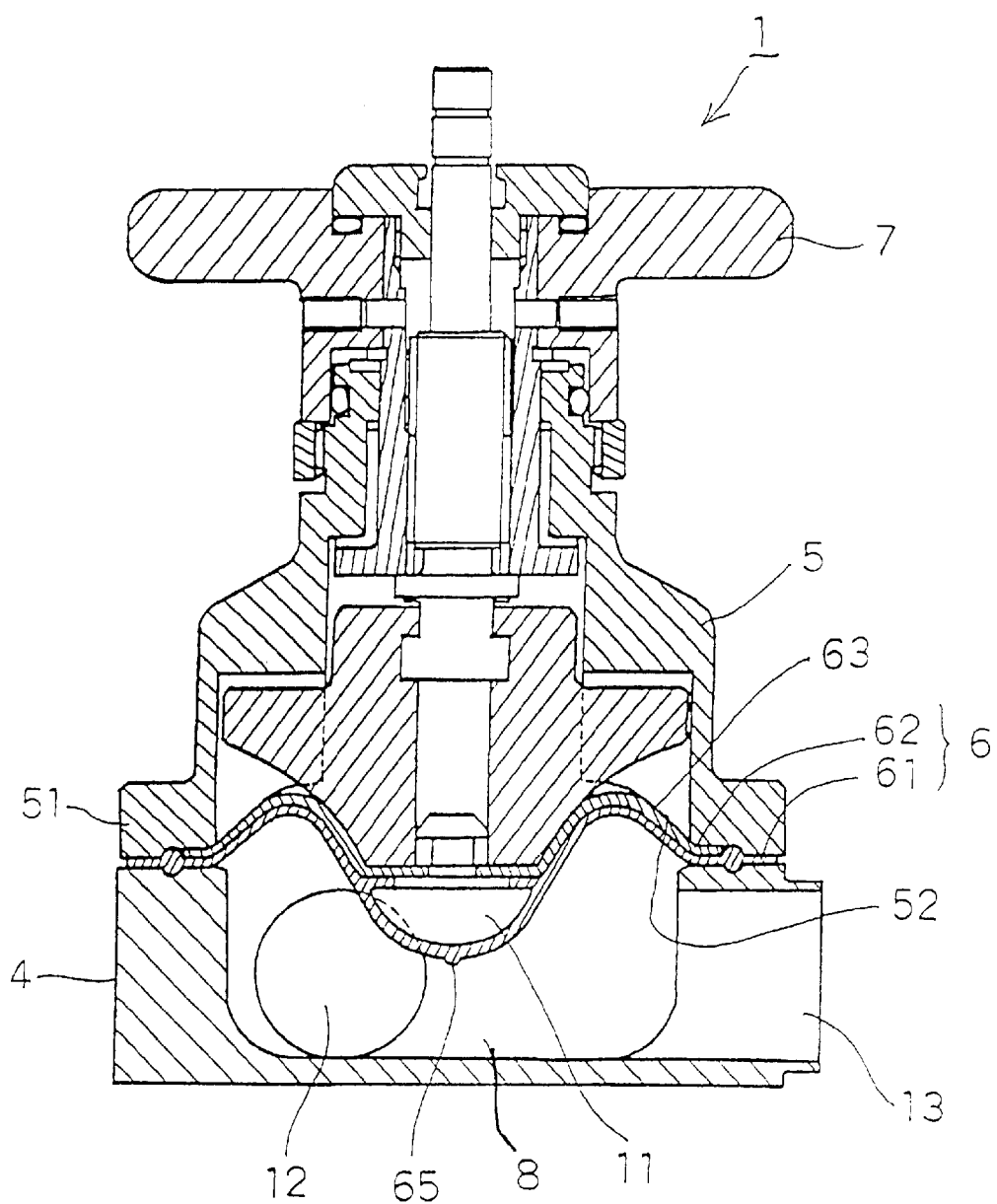
FIG. 9 is a sectional view showing the 2nd embodiment of the fluid controller related to the present invention.
Figure 10:
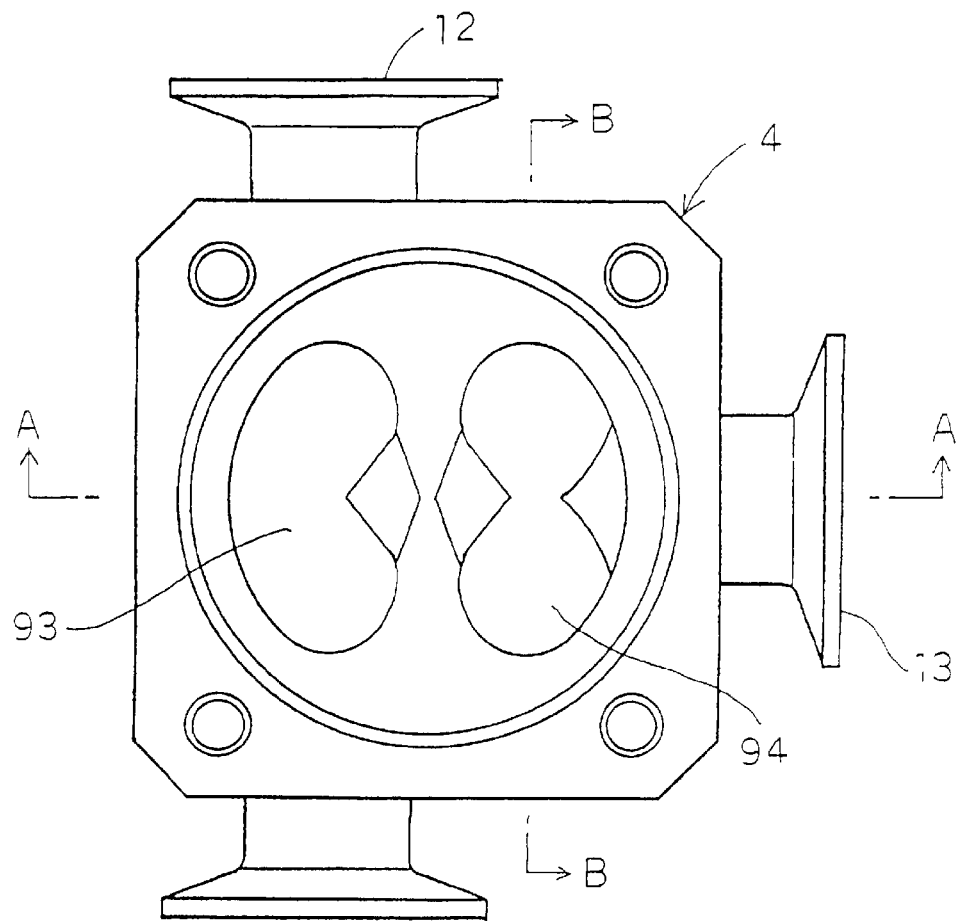
FIG. 10 is a plan view of the valve body of the fluid controller related to the 2nd embodiment.
Figure 11:
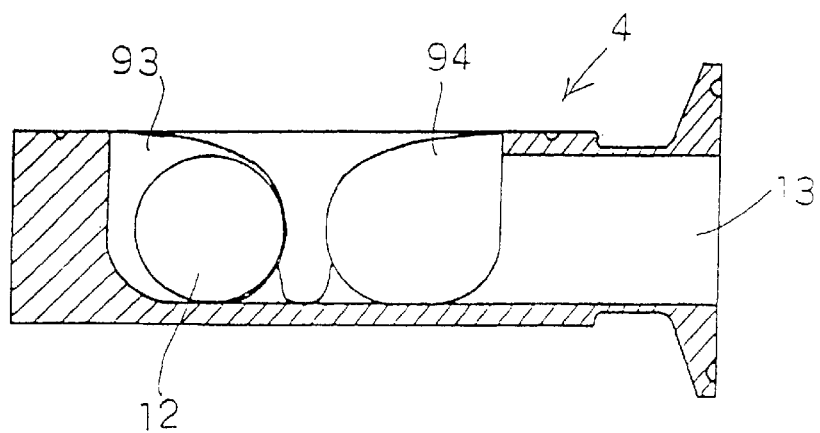
FIG. 11 is a sectional view for an A—A line in FIG. 10.
Figure 12:
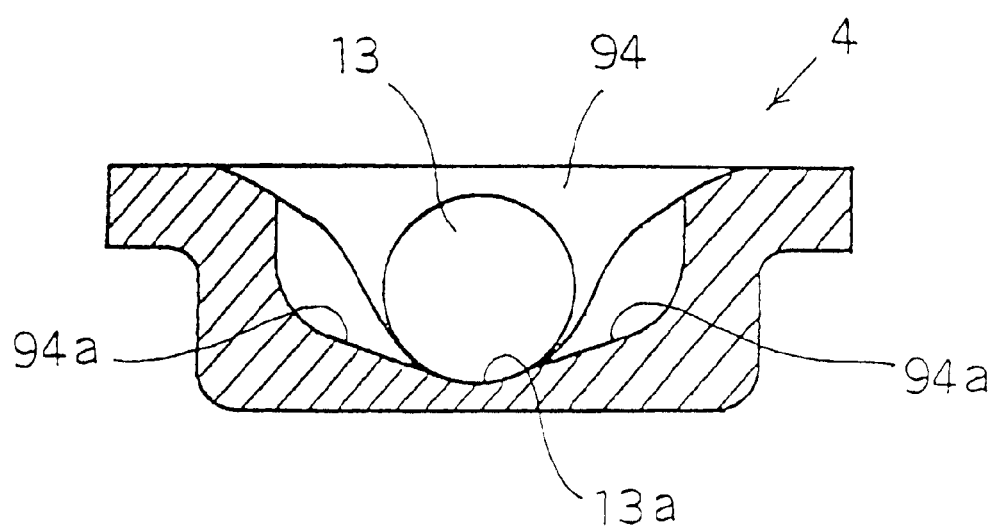
FIG. 12 is a sectional view for a B—B line in FIG. 10.

FIG. 9 is a sectional view showing the 2nd embodiment of the fluid controller related to the present invention, FIG. 10 is a plan view of the valve body of the fluid controller related to the 2nd embodiment, FIG. 11 is a sectional view for an A—A line in FIG. 10 and FIG. 12 is a sectional view for an B—B line in FIG. 10.

The fluid controller 1 related to the 2nd embodiment comprises: a valve body 4 having flow paths used as inlet and outlet for fluid; a diaphragm 6 held fixedly between upper surface of the valve body 4 and the lower surface of a bonnet 5; and an operation mechanism 7 moving the diaphragm 6 in vertical direction.

The point that the fluid controller 1 related to the 2nd embodiment is different from the 1st embodiment is that the inlet flow path and the outlet flow path having a valve body 4 is a T-letter shaped flow path comprising a penetration flow path 12 penetrating the valve body 4 and a branch flow path 13 branched from said penetration flow path 12.

Further, the penetration flow path 12 and the branch flow path 13 communicate with each other through the protrusion-free communication path 8, and occurrence of puddle in the flow paths is prevented.

Moreover, the inside diameter of the penetration flow path 12 and the branch flow path 13 are the same diameter, and a bottom surface of the penetration flow path 12 exists at the same level as a bottom surface of the communication path 8 as shown in FIG. 9. Also, the penetration flow path 12 is provided as that the inside surface thereof on a side of the branch flow path 13 is located to the position tilted a little in the opposite direction of the branch flow path 13 from the center of valve body 4.

Incidentally, mark 93 in the Figure is a hole (referred to as a hole on the outlet flow path) from the upper surface of the valve body 4 to the penetration flow path 12, and mark 94 is a hole (referred to as a hole on the inlet flow path) from the upper surface of valve body 4 to the branch flow path 13.

In the fluid controller 1 related to the 2nd embodiment, it is also superior in processability very much since a processing for the penetration flow path 12 and the branch flow path 13 and a center processing for valve body 4 can be worked independently.

Further, in the fluid controller related to the 2nd embodiment as shown in FIG. 12, a bottom face 94a that is orthogonal with flow path axis (a center axis of inlet flow path 13) of a hole on the inlet flow path 94 inclines downward in the direction of a bottom face 13a of the center axis of inlet flow path 13.

Then, this bottom face 94a of hole on the inlet flow path 94 is in collinear and a side face getting the bottom face 94a of the hole on the inlet flow path 94 is almost perpendicular to a bottom face 13a of the center axis of inlet flow path 13.

Therefore, liquid in flow path can achieve to the center axis of inlet flow path 13 with flowing along inclined the bottom face 94a even if the fluid controller slightly inclines when it is plumbed, and it is hard to occur puddle in inflow path.

Figure 13:
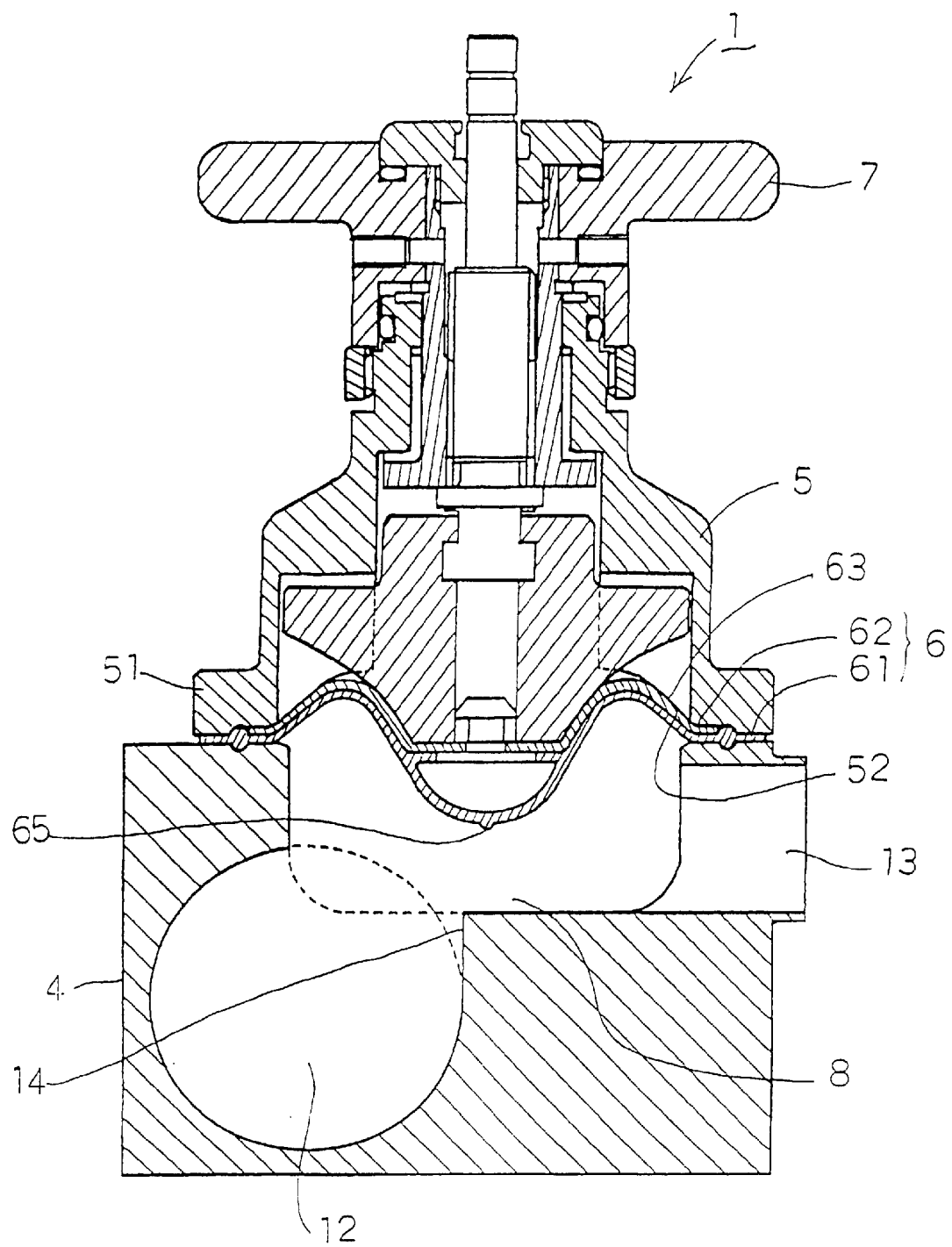
FIG. 13 is a sectional view showing the 3rd embodiment of the fluid controller related to the present invention.
Figure 14:
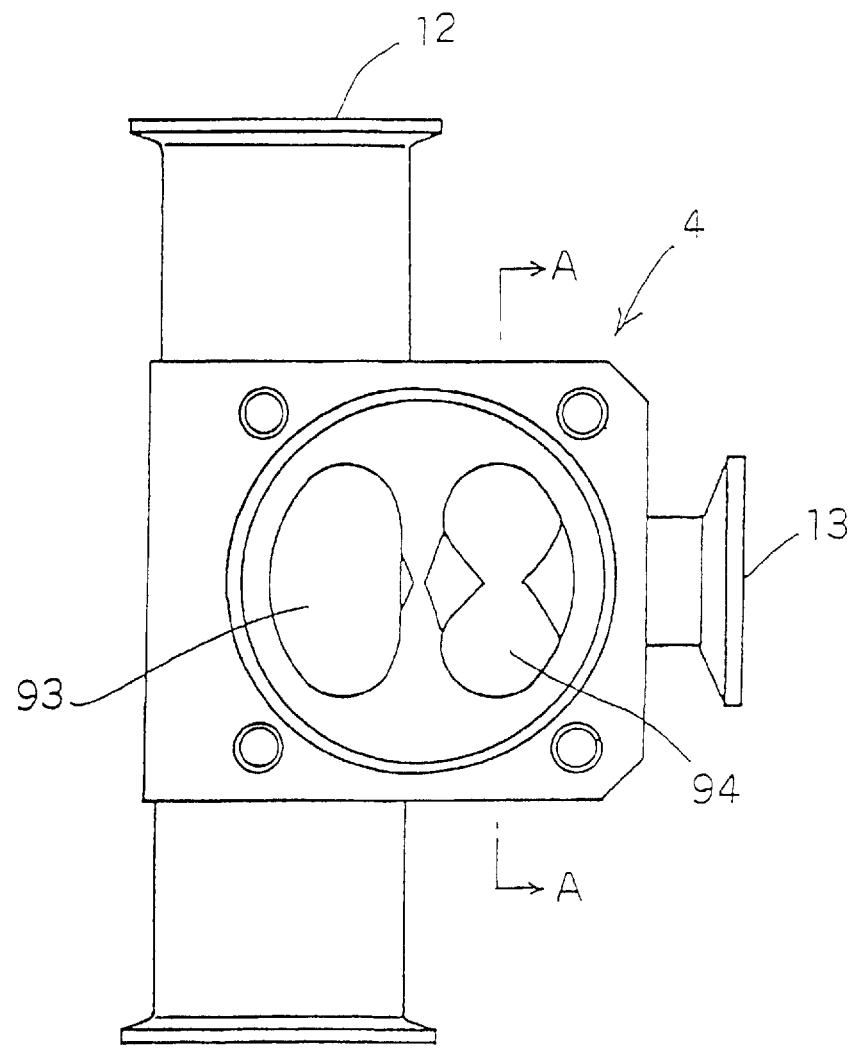
FIG. 14 is a plan view of the valve body of the fluid controller related to the 3rd embodiment.
Figure 15:
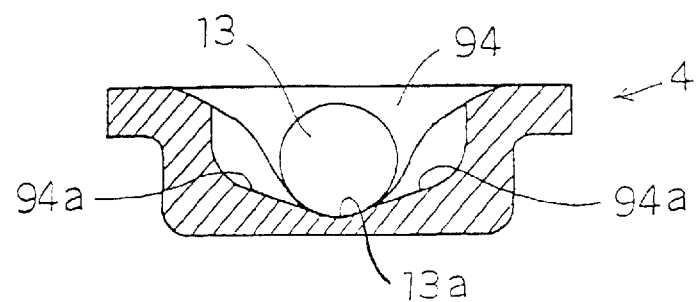
FIG. 15 is a sectional view for an A—A line in FIG. 14.

FIG. 13 is a sectional view showing the 3rd embodiment of the fluid controller related to the present invention, FIG. 14 is a plan view of the valve body of the fluid controller related to the 3rd embodiment and FIG. 15 is a sectional view for an A—A line in FIG. 14.

The fluid controller 1 related to the 3rd embodiment comprises: a valve body 4 having flow paths used as inlet and outlet for fluid; a diaphragm 6 held fixedly between upper surface of the valve body 4 and the lower surface of a bonnet 5; and an operation mechanism 7 moving the diaphragm 6 in vertical direction.

The fluid controller 1 related to the 3rd embodiment as same as the one in the 2nd embodiment, the flow path provided on a valve body 4, which is the T-letter shaped flow path comprising a penetration flow path 12 penetrating the valve body 4 and a branch flow path 13 branched from said penetration flow path 12 and the branch flow path 13 communicate with each other through a protrusion-free communication path 8.

The penetration flow path 12 is provided as that the inside surface thereof on a side of the branch flow path 13 is located to the position tilted a little in the opposite direction of the branch flow path 13 from the center of valve body 4.

The difference points in the fluid controller 1 related to the 3rd embodiment from the one in the 2nd embodiment are that the diameter of penetration flow path 12 is about twice the large size of the diameter of branch flow path 13 and the penetration flow path 12 is where a central axis line thereof is positioned below the bottom of the communication path 8.

A communication surface 14 from the penetration flow path 12 to the communication path 8 is formed as an inclination horizontally or downward when the penetration flow path 12 is arranged horizontally and the branch flow path 13 is arranged downward.

Therefore, with the composition whereof the penetration flow path 12 and the branch flow path 13 communicate with each other through the protrusion-free communication path 8, occurrence of puddle in the flow paths is prevented completely when the penetration flow path 12 is arranged horizontally and the branch flow path 13 is arranged downward.

Incidentally, mark 93 in the Figure is a hole (referred to as hole on the outlet flow path) from the upper surface of the valve body 4 to the penetration flow path 12, and mark 94 is a hole (referred to as hole on the inlet flow path) from the upper surface of valve body 4 to the branch flow path 13.

In the fluid controller 1 related to the 3rd embodiment, it is also superior in processability very much since a processing for the penetration flow path 12 and the branch flow path 13 and a center processing for valve body 4 can be worked independently.

Further, in the fluid controller related to the 3rd embodiment as shown in FIG. 15, the bottom face 94a that is orthogonal with the flow path (a center axis of branch flow path 13) of a hole on the inlet flow path 94 inclines downward in the direction of the bottom face 13a of the center axis of branch flow path 13.

Then, this bottom face 94a of hole on the inlet flow path 94 is in collinear and a side face to the bottom face 94a of the hole on the inlet flow path 94 is almost perpendicular to the bottom face 13a of the center axis of inlet flow path 13.

Therefore, liquid in a flow path can achieve to the center axis of inlet flow path 13 with flowing along inclined the bottom face 94a even if the fluid controller slightly inclines when it is plumbed, and it is hard to occur puddle in inflow path.

Figure 16:
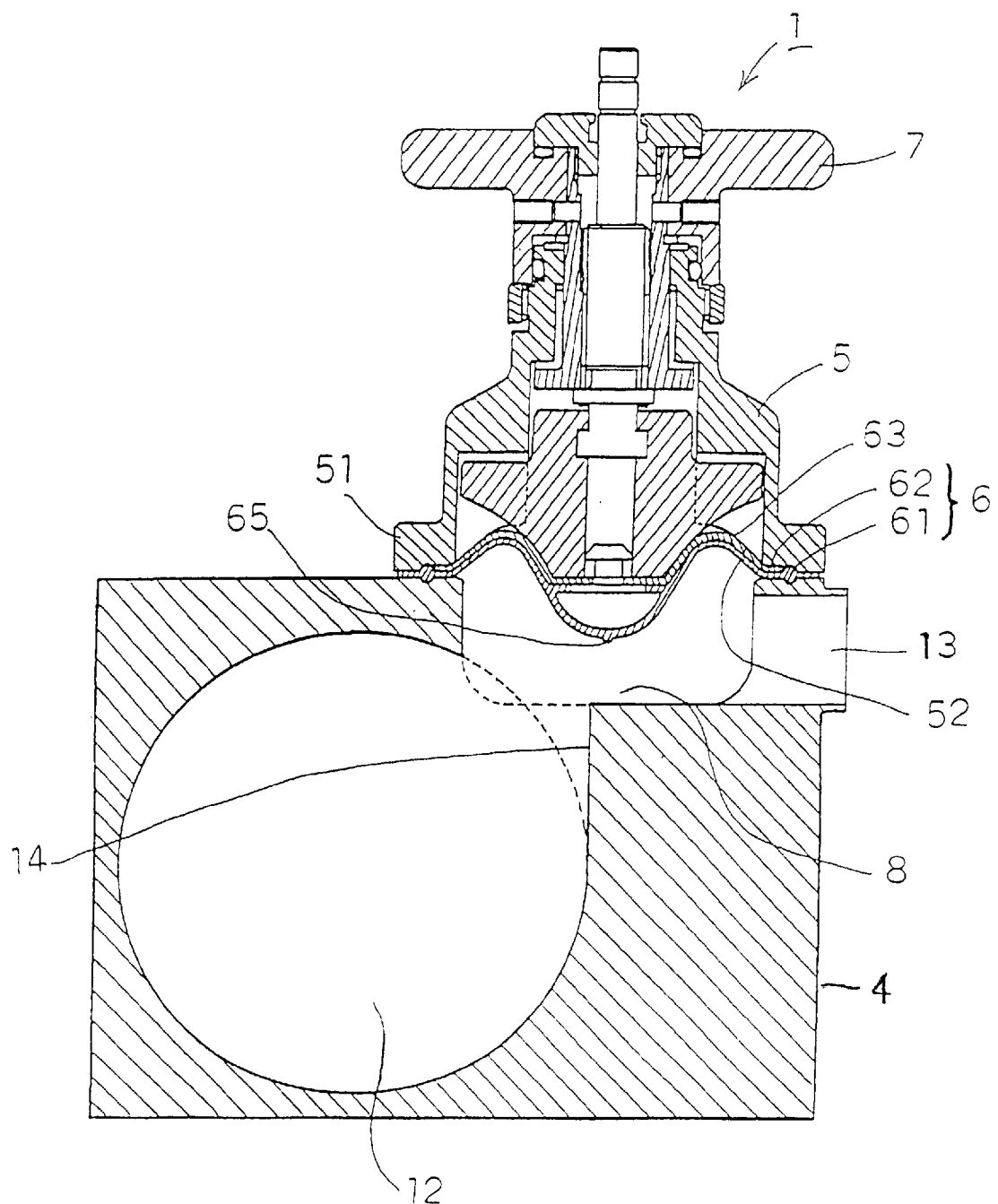
FIG. 16 is a sectional view showing the 4th embodiment of the fluid controller related to the present invention.
Figure 17:
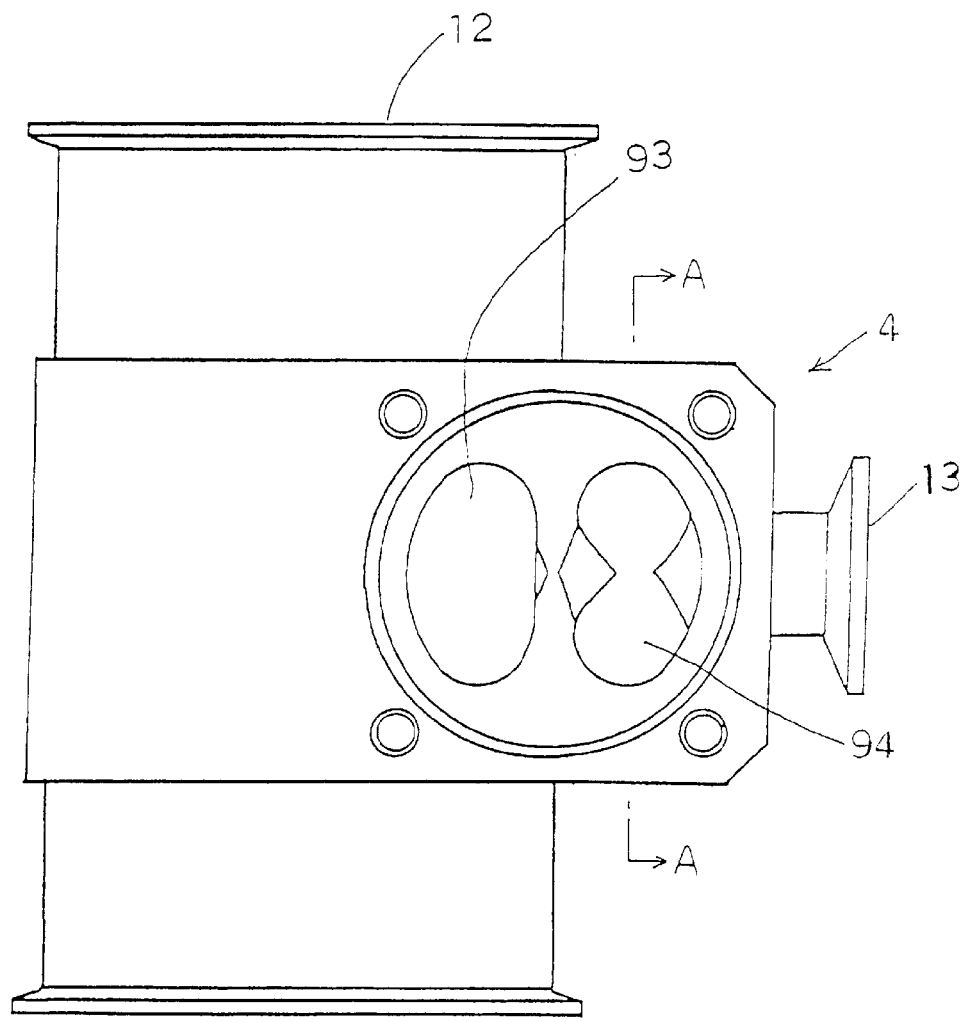
FIG. 17 is a plan view of the valve body of the fluid controller related to the 4th embodiment.
Figure 18:
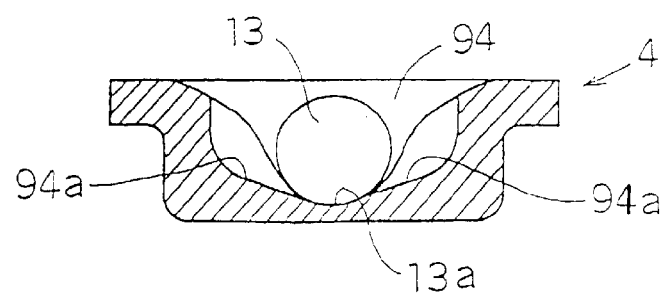
FIG. 18 is a sectional view for an A—A line in FIG. 17.

FIG. 16 is a sectional view showing the 4th embodiment of the fluid controller related to the present invention, FIG. 17 is a plan view of the valve body of the fluid controller related to the 4th embodiment and FIG. 18 is a sectional view for an A—A line in FIG. 17.

The fluid controller 1 related to the 4th embodiment comprises: a valve body 4 having flow paths used as inlet and outlet for fluid; a diaphragm 6 held fixedly between upper surface of the valve body 4 and the lower surface of a bonnet 5; and an operation mechanism 7 moving the diaphragm 6 in vertical direction.

The fluid controller 1 related to the 4th embodiment, as same as the one in the 2nd embodiment, the flow path provided on a valve body 4 is a T-letter shaped flow path comprising a penetration flow path 12 penetrating the valve body 4 and a branch flow path 13 branched from said penetration flow path 12, and the penetration flow path 12 and the branch flow path 13 communicate with each other through a protrusion-free communication path 8.

The penetration flow path 12 is provided as that the inside surface thereof on a side of the branch flow path 13 is located to the position tilted a little in the opposite direction of the branch flow path 13 from the center of valve body 4.

The difference points in the fluid controller 1 related to the 4th embodiment from the one in the 2nd embodiment are that the diameter of penetration flow path 12 is about from four to five times the large size of the diameter of branch flow path 13 and the penetration flow path 12 is where a central axis line thereof is positioned below the bottom of the communication path 8.

Communication surface 14 from the penetration flow path 12 to the communication path 8 is formed as an inclination horizontally or downward when the penetration flow path 12 is arranged horizontally and the branch flow path 13 is arranged downward, as same as the 3rd embodiment.

Also in the fluid controller 1 related to the 4th embodiment, therefore, with the composition whereof the penetration flow path 12 and the branch flow path 13 communicate with each other through the protrusion-free communication path 8, occurrence of puddle in the flow paths is prevented completely when the penetration flow path 12 is arranged horizontally and the branch flow path 13 is arranged downward.

Incidentally, mark 93 in the Figure is a hole (referred to as hole on the outlet flow path) from the upper surface of the valve body 4 to the penetration flow path 12, and mark 94 is a hole (referred to as hole on the inlet flow path) from the upper surface of valve body 4 to the branch flow path 13.

In the fluid controller 1 related to the 4th embodiment, it is also superior in processability very much since a processing for the penetration flow path 12 and the branch flow path 13 and a center processing for valve body 4 can be worked independently.

Further, in the fluid controller related to the 4th embodiment as shown in FIG. 18, a bottom face 94a that is orthogonal with the flow path (a center axis of branch flow path 13) of a hole on the inlet flow path 94 inclines downward in the direction of the bottom face 13a of the center axis of the branch flow path 13.

Then, this bottom face 94a of hole on the inlet flow path 94 is in collinear and a side face to the bottom face 94a of the hole on the inlet flow path 94 is almost perpendicular to the bottom face 13a of the center axis of the inlet flow path 13.

Therefore, liquid in flow path can achieve to the center axis of inlet flow path 13 with flowing along inclined the bottom face 94a even if the fluid controller slightly inclines when it is plumbed, and puddle is hard to occur in inflow path.

In the fluid controller 1 (from the 1st to the 4th embodiment) related to the present invention as described above, the diaphragm 6 have double layered structure comprised a lower part diaphragm 61 which a tip of hanging lug 11 is buried and an upper part diaphragm 62 provided with sticking to an upper surface of the lower part diaphragm 61.

For the lower part diaphragm 61, a synthetic resin film made of polytetrafluoroethylene (PTFE) and the like is preferably used, and for the upper part diaphragm 62, a rubber film made of synthetic rubber, such as natural rubber, nitrile rubber, styrene rubber, fluoric rubber (FPM), and ethylene propylene rubber (EPDM), is preferably used.

Figure 19:
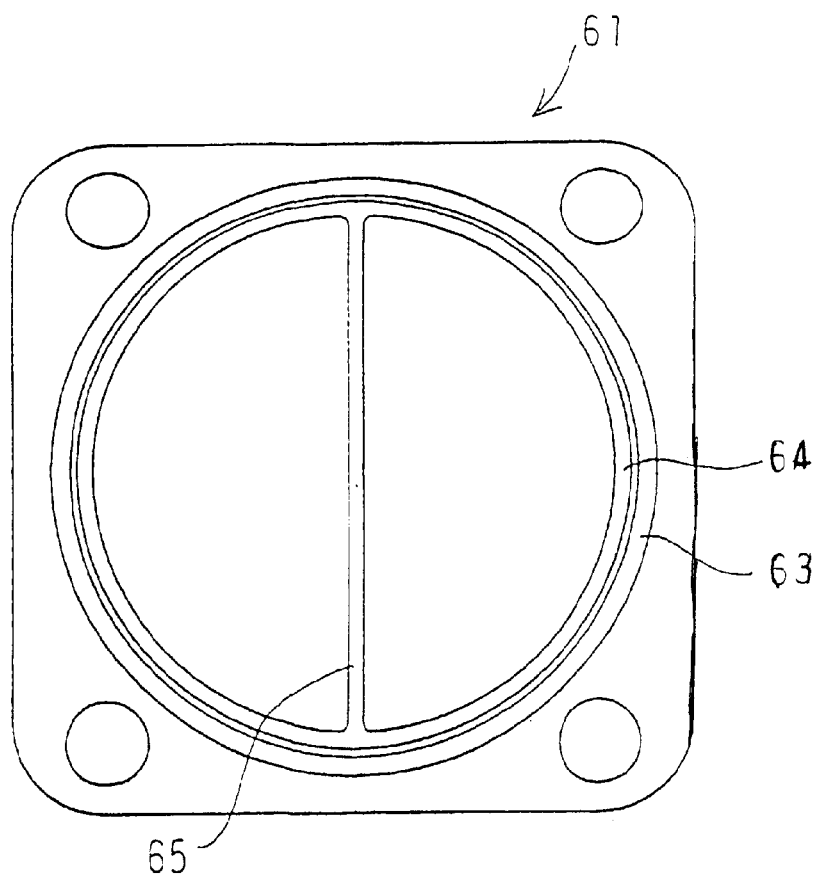
FIG. 19 is a bottom plan view of the lower part of diaphragm in the fluid controller related to the present invention.
Figure 20:
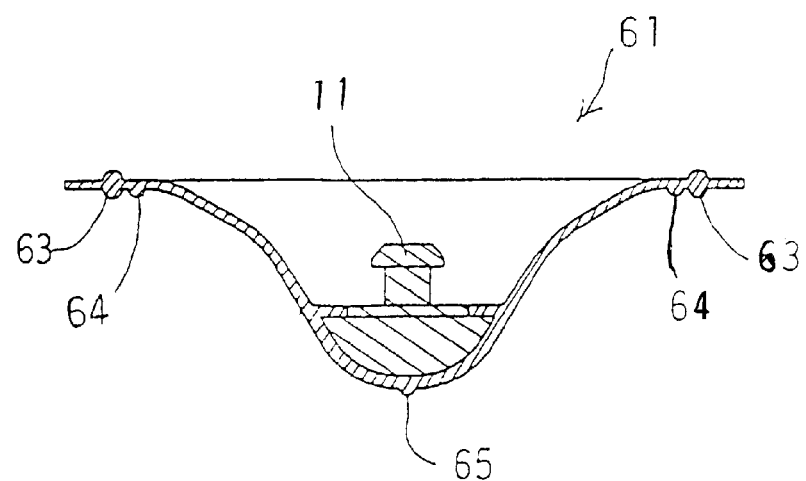
FIG. 20 is a sectional view of the lower part of diaphragm.
Figure 21:
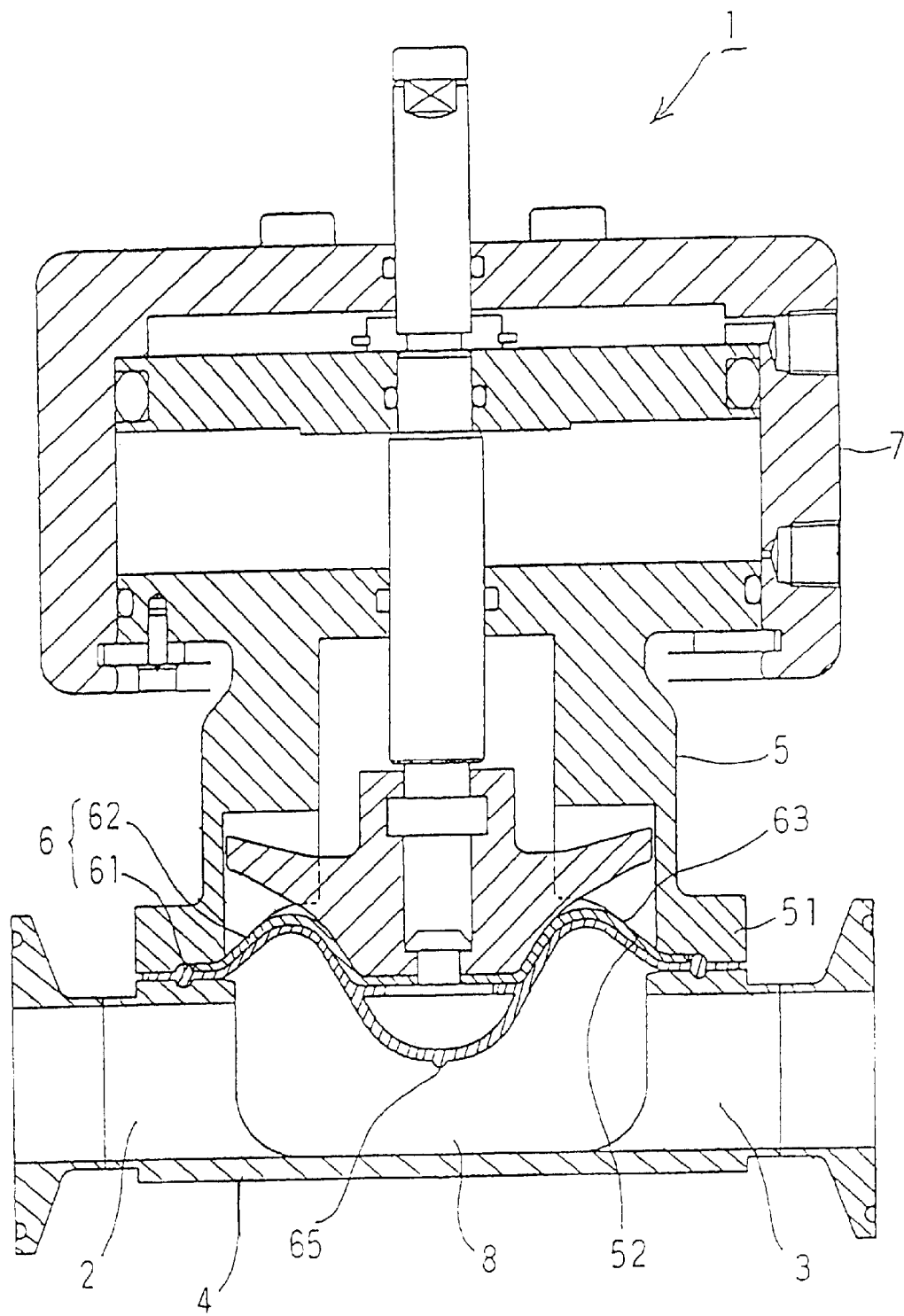
FIG. 21 is a sectional view showing the condition whereof the diaphragm in the fluid controller of the 1st embodiment is raised.

FIG. 19 is a bottom plan view of the lower part of diaphragm 61 and FIG. 20 is a sectional view thereof.

As shown in Figures, annular ridges, which comprised outside annular ridge 63 and inside annular ridge 64, near the periphery part of the lower part diaphragm 61 and longitudinal ridge 65 which runs the inside annular ridge 64 longitudinally are formed.

As shown in the FIG. 1 and the like, the outside annular ridge 63 plays a role to hold the lower part diaphragm 61 fixedly between the valve body 4 and the bonnet 5, and the inside annular ridge 64 plays a role to hold the upper side diaphragm 62 fixedly at the place under the lower surface of bonnet 5.

Moreover, the longitudinal ridge 65 plays a role whereof the lower surface of lower part diaphragm 61 is fitted closely to the communication path 8 surely and the flow path is closed when diaphragm 6 lowers.

The diaphragm 6, when it lowers, closes the flow path by fitting closely the lower surface of lower part diaphragm 61 to the communication path 8 as shown in FIG. 1.

Further, when diaphragm 6 rises to open the flow path, a center part of the diaphragm is recessed and its part near the outer periphery part is protruded so that it shows as M-letter shape in a sectional view as shown in FIG. 9, FIG. 13, FIG. 16 and FIG. 21. At this time, an outer upper surface 63 of the diaphragm protruded part fits closely to a curved surface 52 that is formed at inner (a central axial direction) lower surface of a diaphragm holding part 51 of the bonnet 5.

As the above, by composing that the outer upper surface of the diaphragm protruded part fits closely to the curved surface which is formed at the inner lower surface of a diaphragm holding part of the bonnet when the diaphragm rises, it is possible adjusting to correspondence for the valve body 4 and the bonnet 5 easily very much with spending short time when producing, and it is hard to occur gap when assembling.

Figure 22:
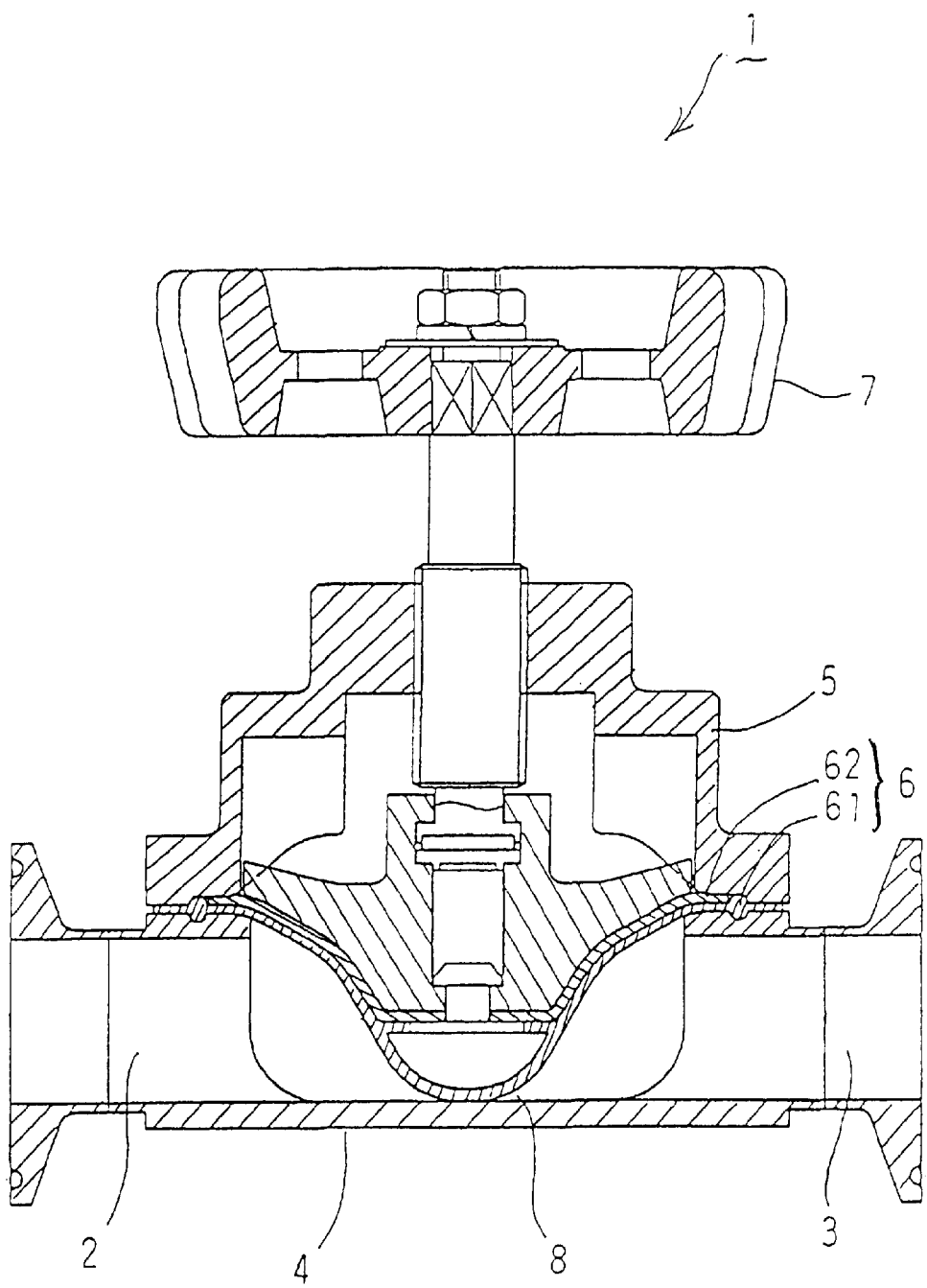
FIG. 22 is a sectional view showing another implementation form of the fluid controller related to the present invention.
Figure 23:
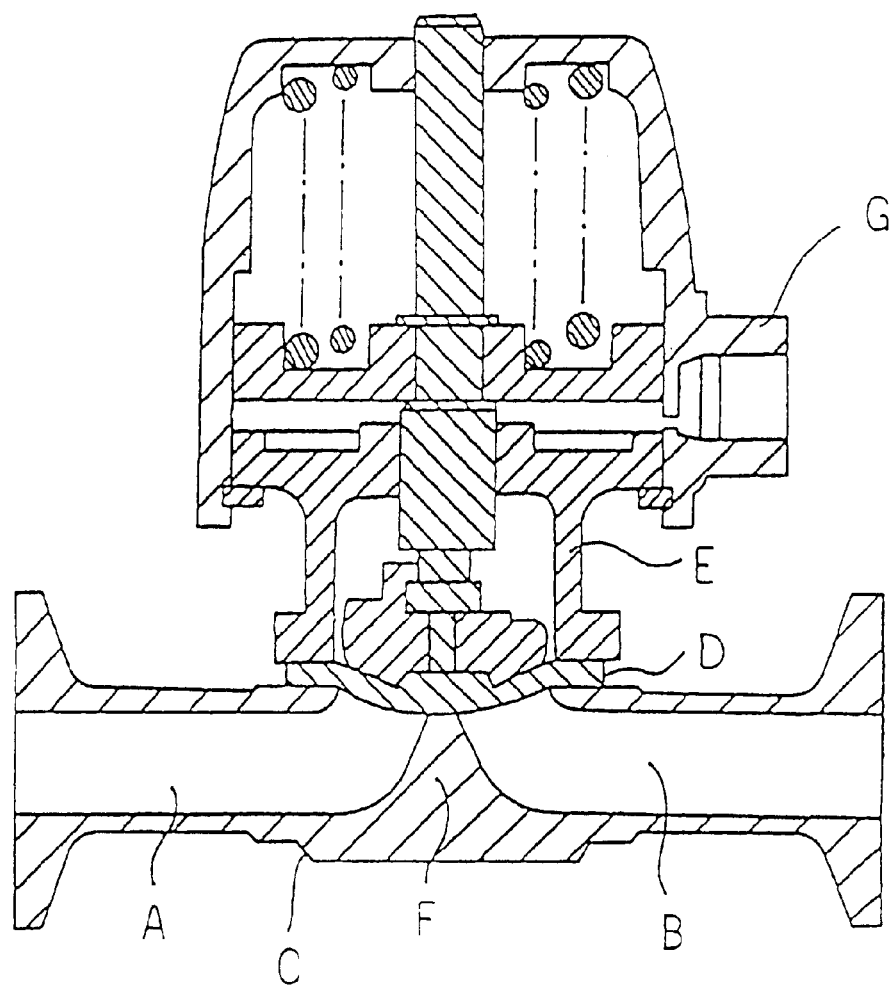
FIG. 23 is a sectional view showing an example of the conventional fluid controller.
Figure 24:
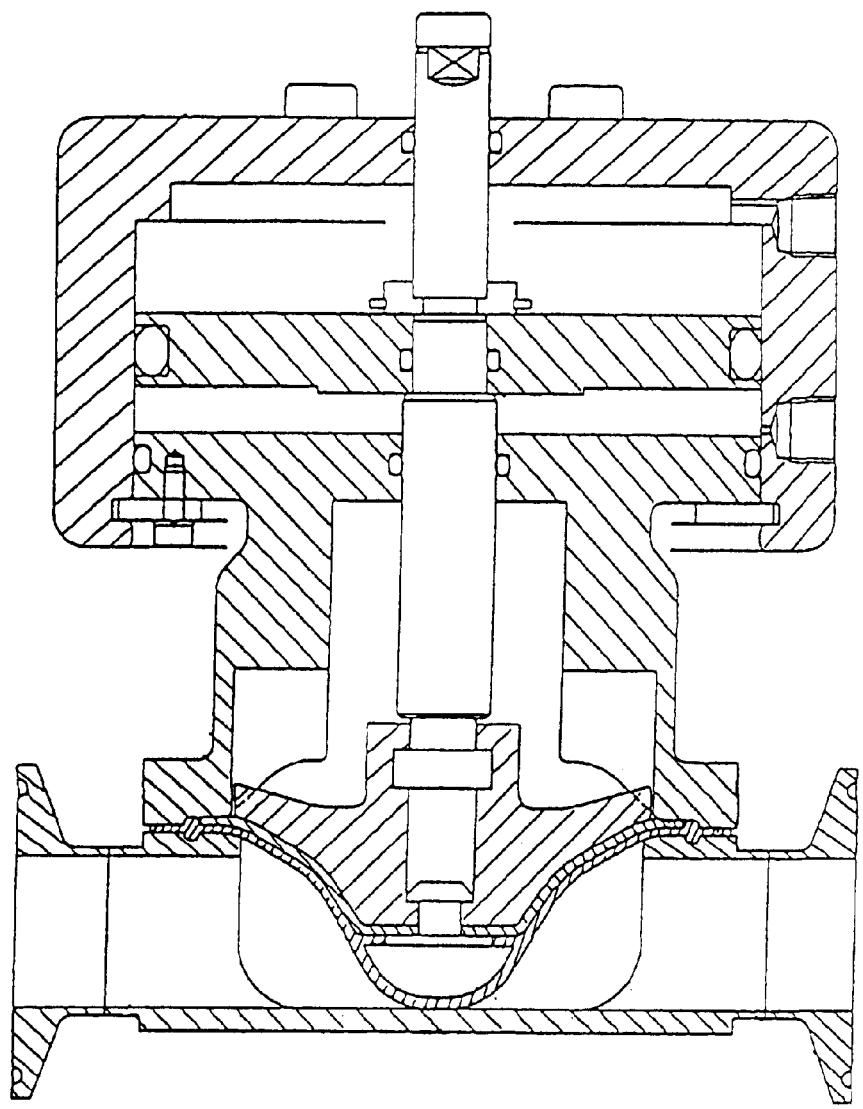
FIG. 24 is a sectional view showing the fluid controller new-created by the applicant before.
Figure 25:
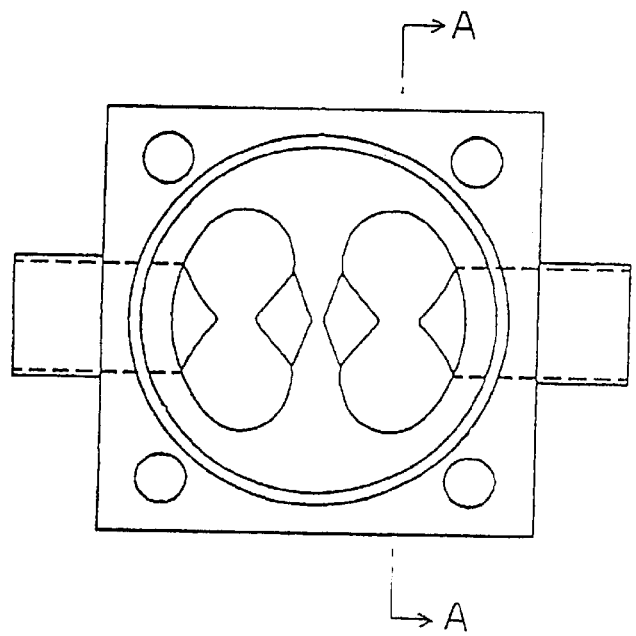
FIG. 25 is a plan view of the valve body of the fluid controller in FIG. 24.
Figure 26:
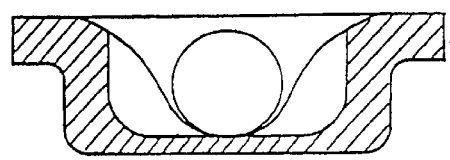
FIG. 26 is a sectional view for an A—A line in FIG. 25.
Figure 27:
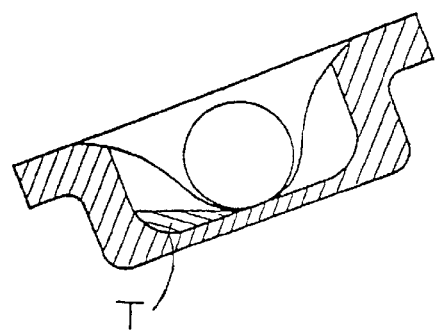
FIG. 27 is a view of explaining a problem of the fluid controller new-created by the applicant before.

Incidentally, in the fluid controller 1 related to the present invention, the operation mechanism 7 moving diaphragm 6 in vertical direction is not restricted especially, but it can be air pressure operated system using a compressor as shown in FIG. 1 and manual operated system as shown in FIG. 9 and FIG. 22. Also, other operated system, which is well known, can be used appropriately.

The Availability on the Industry

As described above, the fluid controller related to the present invention can be preferably used for sampling plumbing at the cultivation equipment of the microorganism, supplying liquid plumbing and the like because puddle never occurs in the flow path and it is superior in cleaning-ability in the pipe.

What is claimed is:

1. The fluid controller, which is a fluid controller (1) comprising: a valve body (4) having flow paths used as inlet and outlet for fluid; a diaphragm (6) held fixedly between the valve body and a bonnet (5); and an operation mechanism (7) moving the diaphragm in vertical direction, wherein said flow paths of the valve body communicate with each other through a protrusion-free communication path (8), said diaphragm is fitted closely to the communication path when lowered so as to close the flow path and when raised, the center part of the diaphragm is recessed and its part near the outer periphery part is protruded, a curved surface (52) to which an outer upper surface (63) of said protruded part is closely fitted is formed on said bonnet at the inner lower surface of a diaphragm holding part (51), in said valve body, from an upper surface, a hole on the inlet flow path (91,94) thirled toward to an inlet flow path and a hole on the outlet flow path (92, 93) thirled toward to an outlet flow path are provided, a bottom face (91a, 94a) that is orthogonal direction with an inflow axis of said hole on the inlet flow path and/or a bottom face (92a, 93a) that is orthogonal direction with an inflow axis of a hole on the outlet flow path incline downward to a bottom face (2a, 13a) of said inlet flow path and/or a bottom face (3a, 12a) of said outlet flow path, said diaphragm have double layered structure comprised a lower part diaphragm (61) and an upper part diaphragm (62), annular ridges, which comprised outside annular ridge (66) and inside annular ridge (64), near the periphery part of the lower part diaphragm (61) is formed, and said outside annular ridge is projecting in vertical direction.

2. The fluid controller described in claim 1, wherein said flow paths provided on the valve body are comprised said inlet flow path (2) and said outlet flow path (3) which are arranged on the identical axis line.

3. The fluid controller described in claim 1, wherein said flow path provided on a valve body is a T-letter shaped flow path comprising a penetration flow path (12) penetrating the valve body and a branch flow path (13) branched from the penetration flow path and a bottom surface of the penetration flow path exists at the same level as a bottom surface of the communication path.

4. The fluid controller described in claim 1, wherein said inlet flow path and said outlet flow path are a T-letter shaped flow path comprising a penetration flow path penetrating the valve body and a branch flow path branched from the penetration flow path, the penetration flow path is where a central axis line thereof is positioned below a bottom of said communication path, and a communication surface (14) from the penetration flow path to the communication path is formed as an inclination horizontally or downward when the penetration flow path is arranged horizontally and the branch flow path is arranged downward.

5. The fluid controller described in claim 4, wherein the diameter of said penetration flow path is larger than the diameter of the branch flow path.

* * * * *